US00RE40285E

(19) United States
(12) Reissued Patent
Wu

(10) Patent Number: US RE40,285 E
(45) Date of Reissued Patent: May 6, 2008

(54) GRILL DEVICE

(75) Inventor: Tsan-Kuen Wu, Tainan Hsien (TW)

(73) Assignee: Tsann Kuen USA, Inc., Pasadena, CA (US)

(21) Appl. No.: 10/850,581

(22) Filed: May 20, 2004

Related U.S. Patent Documents

Reissue of:
(64) Patent No.: 6,393,970
Issued: May 28, 2002
Appl. No.: 10/005,525
Filed: Dec. 4, 2001

U.S. Applications:
(63) Continuation-in-part of application No. 09/960,577, filed on Sep. 20, 2001, now Pat. No. 6,401,601.

(51) Int. Cl.
*A47J 37/00* (2006.01)
*A47J 37/04* (2006.01)
*A47J 37/07* (2006.01)

(52) U.S. Cl. ..... 99/331; 99/340; 99/349; 99/375; 99/378; 99/400; 99/444; 99/446

(58) Field of Classification Search ..... 99/331–333, 99/339, 340, 349, 353–355, 372–382, 400, 99/401, 444–450, 482; 126/41 R, 25 R, 9 R
See application file for complete search history.

(56) References Cited

U.S. PATENT DOCUMENTS 1,627,742 A * 5/1927 Jones ..... 99/445
3,880,064 A * 4/1975 Martinez ..... 99/349
4,972,766 A * 11/1990 Anetsberger ..... 99/332
5,473,976 A * 12/1995 Hermansson ..... 99/349
5,531,155 A * 7/1996 Pellicane et al. ..... 99/349
5,555,794 A * 9/1996 Templeton et al. ..... 99/349
5,655,434 A * 8/1997 Liebermann ..... 99/330
5,676,046 A * 10/1997 Taber et al. ..... 99/340
5,755,150 A * 5/1998 Matsumoto et al. ..... 99/334
5,771,782 A * 6/1998 Taber et al. ..... 99/340
5,802,958 A * 9/1998 Hermansson ..... 99/349
5,839,359 A * 11/1998 Gardner ..... 99/376
5,881,634 A * 3/1999 Newton ..... 99/349
5,890,419 A * 4/1999 Moravec ..... 99/349
6,363,835 B1 * 4/2002 Wu ..... 99/331
6,401,601 B1 * 6/2002 Wu ..... 99/331
6,484,624 B1 * 11/2002 Wu ..... 99/339
6,608,292 B1 * 8/2003 Barnes ..... 219/730
6,615,706 B1 * 9/2003 Wu ..... 99/331

* cited by examiner

*Primary Examiner*—Timothy F. Simone
(74) *Attorney, Agent, or Firm*—Brinks Hofer Gilson & Lione

(57) ABSTRACT

A grill device includes two independently controllable cooking sets confining two isolate cooking spaces such that two different meat pieces can be grilled therein under different cooking temperatures at the same time. Each of the cooking sets has a cooking plate provided with first and second grill ribs alternately disposed thereon. The first grill rib has a horizontal flat portion and a curved portion extending curvedly and downwardly from the flat portion. The second grill rib has a horizontal flat portion, and a curved portion extending curvedly and upwardly from the flat portion. The curved portion of the second grill rib has an elevation higher than those of the flat portions of the first and second ribs to prevent sliding out a meat piece from the cooking plate when the meat piece is disposed on the flat portions of the first and second grill ribs.

7 Claims, 2 Drawing Sheets

GRILL DEVICE

Matter enclosed in heavy brackets [ ] appears in the original patent but forms no part of this reissue specification; matter printed in italics indicates the additions made by reissue.

CROSS-REFERENCE TO RELATED APPLICATION

*This application is a reissue of U.S. Pat. No. 6,393,970 B1, which was filed as application Ser. No. 10/005,525 on Dec. 4, 2001, entitled "GRILL DEVICE", and which is a continuation-in part (CIP) of U.S. patent application Ser. No. 09/960,577 filed Sep. 20, 2001, entitled "GRILL DEVICE HAVING TWO INDEPENDENTLY CONTROLLABLE COOKING SETS" which issued as U.S. Pat. No. 6,401,601 B1 on Jun. 11, 2002, the contents of which is incorporated herein by reference.*

The invention relates to a grill device, more particularly to a grill device which has a plurality of parallel uniformly spaced apart first and second grill ribs alternately disposed on a cooking surface of the grill device.

The object of this invention is to provide a grill device which has a plurality of first and second grill ribs which permit easy cleaning of the first and second grill ribs and the cooking surface of the grill device.

Accordingly, a grill device of the present invention includes a horizontal lower grill unit, a horizontal upper grill unit, a connecting unit, and a pair of control switches. The lower grill unit has rear and front sides, and is provided with two lower cooking members. The upper grill unit is in the form of two independent upper halves, which are superposed on the lower grill unit so as to dispose each of the upper halves at a closed position with respect to the lower grill unit. Each of the upper halves has a rear side and an upper cooking member which is registered with and which is electrically coupled to a respective one of the lower cooking members of the lower grill unit. The connecting unit interconnects the rear sides of the lower grill unit and the upper halves of the upper grill unit in such a manner that each of the upper halves can be turned rearward from the closed position to an open position, in which a respective one of the upper halves is generally perpendicular to the lower grill unit. Each of the control switches is operable so as to control actuation and cooking temperature of a respective one of the lower cooking members in the lower grill unit and the upper cooking member in a corresponding one of the upper halves. Each of the lower cooking members further includes a cooking plate, a heating member, and a plurality of parallel uniformly spaced apart first and second grill ribs. The cooking plate has a cooking surface extending between the rear and front sides of the lower grill unit. The heating member is disposed below the cooking plate. The first and second grill ribs are alternately disposed on the cooking surface, and extend between the front and rear sides of the lower grill unit. Each of the first and second grill ribs has a top surface above the cooking surface and a front end with a front edge terminating adjacent to the front side of the lower grill unit. The top surface of each of the first grill ribs has a flat portion which extends horizontally from the rear side of the lower grill unit to a position adjacent to the front end of the first grill rib, and a curved portion which extends curvedly and downwardly from the flat portion to the front edge of the front end of the first grill rib. The top surface of each of the second grill ribs has a flat portion which extends horizontally from the rear side of the lower grill unit to a position adjacent to the front end of the second grill rib, and a curved portion which extends curvedly and upwardly from the flat portion of the front edge of the front end of the second grill rib. The curved portion of the second grill ribs have an elevation higher than those of the flat portions of the first and second grill ribs so as to be adapted to prevent a meat piece from sliding off the lower grill unit when the meat piece is disposed on the flat portions of the first and second grill ribs.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
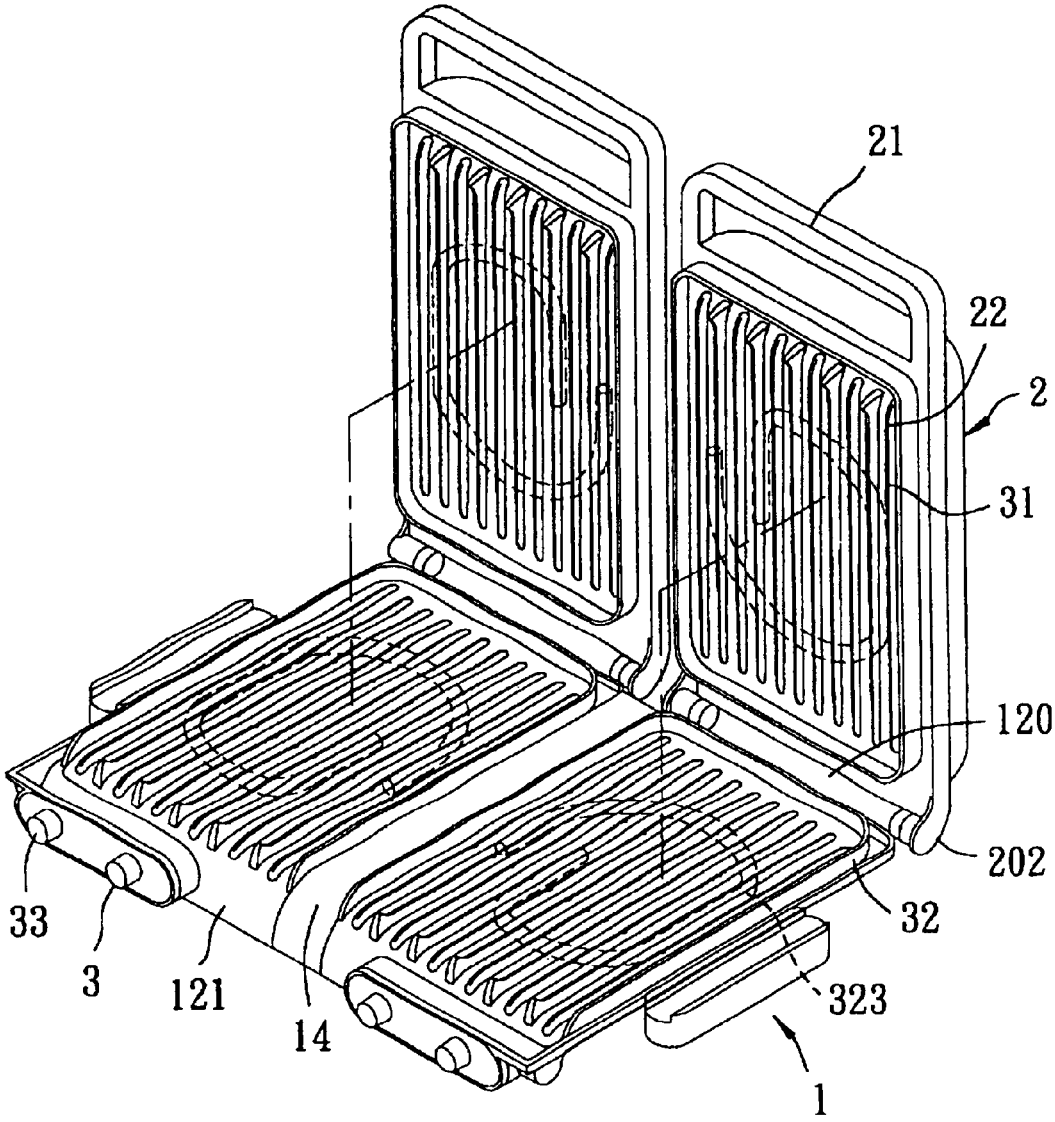
FIG. 1 is a perspective view of the preferred embodiment of a grill device of the present invention at an open position.

Referring to FIG. 1, the preferred embodiment of a grill device of the present invention is shown to include a horizontal single-piece lower grill unit 1 with a rear side 120, a horizontal upper grill unit 2 with a rear side 220, a connecting unit, and a pair of control switches 3.

As illustrated, the lower grill unit 1 has a base 11 with front and rear sides, and a top 12 that is provided with two lower cooking members 32.

The upper grill unit 2 includes two independent upper halves 21, each of which is superposed on the lower grill unit 1 so as to dispose each of the upper halves 21 at a closed position with respect to the lower grill unit 1. Each of the upper halves 21 has a bottom 22 that is provided with an upper cooking member 31 which is registered with and which is electrically coupled to a respective one of the lower cooking members 32 of the lower grill unit 1.

The connecting unit interconnects the rear sides 120,220 of the lower grill unit 1 and the upper halves 21 in such a manner that each of the upper halves 21 can be turned rearward from the closed position to an open position, in which a respective one of the upper halves 21 generally perpendicular to the lower grill unit 1, as best shown in FIG. 1. Since the particular connection between the upper halves 21 and the lower grill unit 1 is not pertinent to the claimed invention, a detailed structure of the same is omitted herein for the sake of brevity.

Each of the control switches 3 is operable in a known manner so as to control actuation and cooking temperature of a respective one of the lower cooking members 32 of the lower grill unit 1 and the upper cooking member 31 of a corresponding one of the upper halves 21. An insulator spacer 14 is disposed between the lower cooking members 32 so as to form two isolated cooking spaces that are confined by the upper halves 21 and the lower cooking members 32. In this embodiment, the control switches 3 are mounted on the lower grill unit 1 at two sides of the insulator spacer 14, and are respectively provided with a temperature control knob 33.

Figure 2:
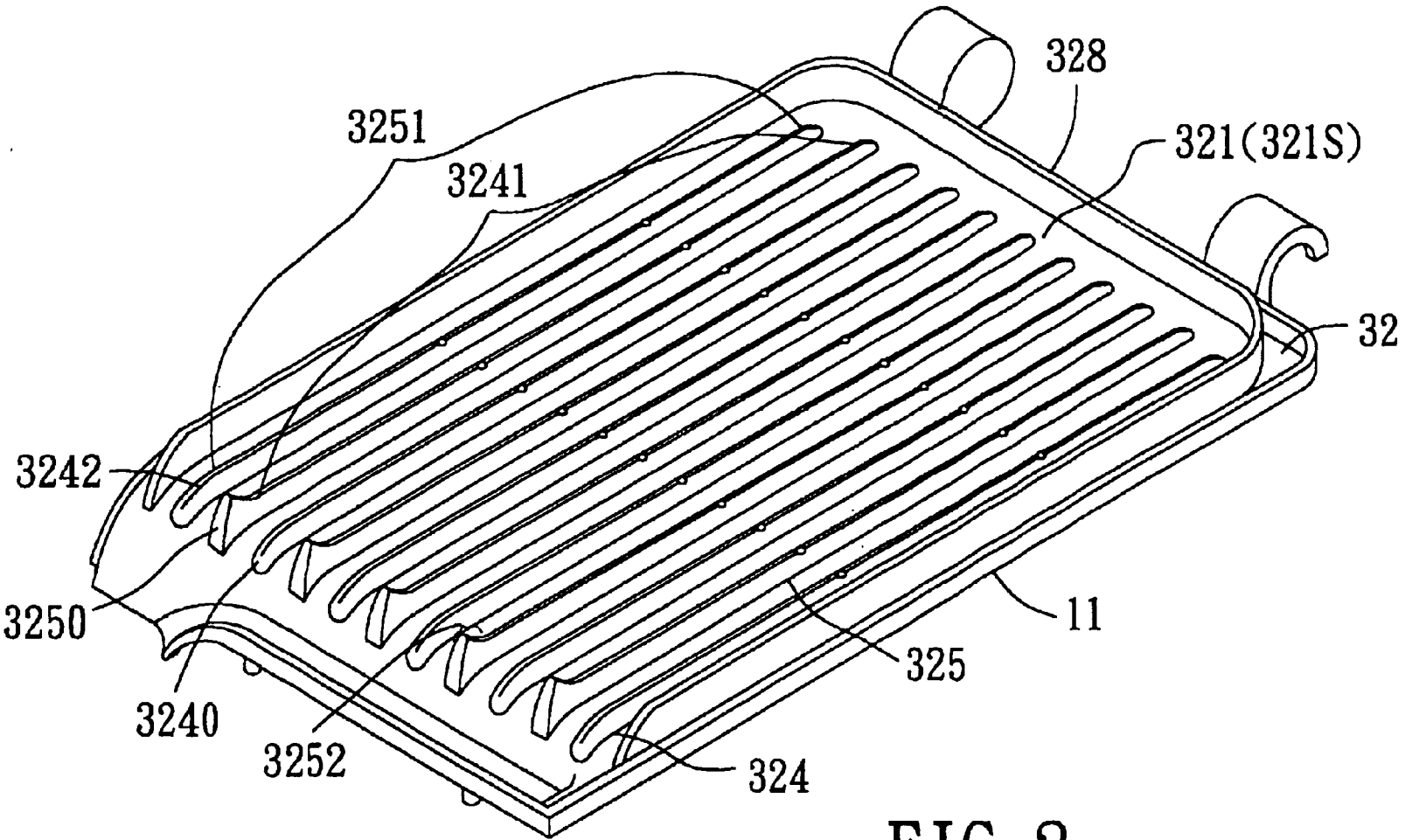
FIG. 2 is an enlarged perspective view of a cooking member employed in a lower grill unit of the preferred embodiment.

Referring to FIG. 2, each of the lower cooking members 32 further includes a cooking plate 321, a heating member 323 (see FIG. 1), and a plurality of parallel uniformly spaced apart first and second grill ribs 324,325. The cooking plate 321 has a cooking surface 321S that extends between the rear side and the front side. The heating member 323 is disposed below the cooking plate 321. The first and second grill ribs 324,325 are alternately disposed on the cooking surface 321S, and extend between the front and rear sides of the lower grill unit 1. Each of the first and second grill ribs 324,325 has a top surface and a front end with a front edge terminating adjacent to the front side of the lower grill unit 1. The top surface of each of the first grill ribs 324 has a flat portion 3241 extending horizontally from the rear side of the lower grill unit 1 to a position adjacent to the front end of the first grill rib 324, and a curved portion 3242 that extends curvedly and downwardly from the flat portion 3241 to the front edge of the first grill rib 324. The top surface of each of the second grill ribs 3251 extending horizontally from the rear side of the lower grill unit 1 to a position adjacent to the front end of the second grill rib 325, and a curved portion 3252 that extends curvedly and upwardly from the flat portion 3251 to the front edge of the second grill rib 3252, and that has an elevation higher than those of the flat portions 3241,3251 of the first and second grill ribs 324,325 so as to prevent a meat piece (not shown) from sliding out of a respective one of the cooking members 32 in the lower grill unit 1 when the meat piece (not shown) is disposed over the flat portions 3241,3251 of the first and second grill ribs 324,325.

Preferably, the cooking surface 321S of the cooking plate 321 inclines gradually from the rear side toward the front side of the lower grill unit 1 to facilitate downflow of oil resulted by virtue of grilling action of the meat piece. A confining-wall 328 is disposed on the cooking surface 321S of the cooking plate 321 to confine the first and second grill ribs 324,325 therein.

Since adjacent front ends of the second grill ribs 325 are spaced by the downwardly curved portion 3242 of the first grill rib 324, cleansing operation therebetween is consequently facilitated.

With this invention thus explained, it is apparent that numerous modifications and variations can be made without departing from the scope and spirit of this invention. It is therefore intended that this invention be limited only as indicated in the appended claims.

I claim:

1. A grill device comprising:

a horizontal single-piece lower grill unit having a rear side, and a front side, and provided with two lower cooking members;

a horizontal upper grill unit in the form of two independent upper halves superposed on said lower grill unit so as to dispose each of said upper halves at a closed position with respect to said lower grill unit, each of said upper halves having a rear side and an upper cooking member which is registered with and which is electrically coupled to a respective one of said lower cooking members of said lower grill unit;

a connecting unit interconnecting said rear sides of said lower grill unit and said upper halves in such a manner that each of said upper halves can be turned rearward from said closed position to an open position, in which a respective one of said upper halves is generally perpendicular to said lower grill unit; and a pair of control switches, each of which is operable so as to control actuation and cooking temperature of a respective one of said lower cooking members in said lower grill unit and said upper cooking member in a corresponding one of said upper halves;

each of said lower cooking members further including a cooking plate having a cooking surface extending between said rear and front sides of said lower grill unit, a heating member disposed below said cooking plate, and a plurality of parallel uniformly spaced apart first and second grill ribs alternately disposed on said cooking surface, and extending between said front and rear sides of said lower grill unit, each of said first and second grill ribs having a top surface and a front end with a front terminating adjacent to said front side of said lower grill unit, said top surface of each of said first grill ribs having a flat portion extending horizontally from said rear side of said lower grill unit to a position adjacent to said front end of said first grill rib, and a curved portion extending curvedly and downwardly from said flat portion to said front edge of said first grill rib, said top surface of each of said second grill ribs having a flat portion extending horizontally from said rear side of said lower grill unit to a position adjacent to said front end of said second grill rib, and a curved portion extending curvedly and upwardly from said flat portion to said front edge of said second grill rib, said curved portions of said second ribs having an elevation higher than those of said flat portions of said first and second ribs so as to prevent a meat piece from sliding out of said lower grill unit when the meat piece is disposed on said flat portions of said first and second grill ribs.

2. The grill device as defined in claim 1, wherein said cooking surface of said cooking plate inclines gradually from said rear side toward said front side of said lower grill unit.

3. The grill device as defined in claim 1, further comprising a confining-wall disposed on said cooking surface of said cooking plate to confine said first and second grill ribs therein.

4. The grill device as defined in claim 1, further comprising an insulator spacer disposed between said lower cooking members so as to form two isolated cooking spaces that are confined by said upper halves and said lower cooking members.

*5. A cooking plate for a cooking member of a grill unit having front and rear sides, said cooking plate comprising:*

*a plate body having front and rear sides and a cooking surface extending between said front and rear sides;*

*said plate body having a plurality of parallel uniformly spaced apart first and second grill ribs that are alternately disposed on said cooking surface, said first and second grill ribs extending between said front and rear sides of said plate body;*

*said first and second grill ribs having a top surface above said cooking surface, and a front end with a front edge terminating adjacent to said front side of said plate body;*

*said top surface of each of said first grill ribs having a flat portion extending from said rear side of said plate body to a position adjacent to said front end of each of said first grill ribs, and a curved portion extending downwardly from said flat portion to said front edge of each of said first grill ribs; and*

*said top surface of each of said second grill ribs having a flat portion extending from said rear side of said plate body to a position adjacent to said front end of each of said second grill ribs, and a curved portion extending curvedly and upwardly from said flat portion to said front edge of said front end of each of said second grill*

*ribs, said curved portions of each of said second grill ribs having an elevation higher than that of said flat portion of each of said first and second grill ribs.*

*6. The cooking plate of claim 5, wherein said flat portion of said top surface of each of said first and second grill ribs extends horizontally from said rear side of said plate body.*

*7. The cooking plate of claim 5, wherein said cooking plate is adapted to be disposed so as to incline gradually from said rear side of said grill unit toward said front side of said grill unit.*

* * * * *

UNITED STATES PATENT AND TRADEMARK OFFICE

CERTIFICATE OF CORRECTION

PATENT NO. : RE 40,285 E
APPLICATION NO. : 10/850581
DATED : May 6, 2008
INVENTOR(S) : Tsan-Kuen Wu It is certified that error appears in the above-identified patent and that said Letters Patent is hereby corrected as shown below:

On the Title Page

In column 2, line 2, under "ABSTRACT", after "confining two" delete "isolate" and substitute --isolated-- in its place.

Signed and Sealed this

Second Day of September, 2008

JON W. DUDAS
*Director of the United States Patent and Trademark Office*